(12) United States Patent
Kawasaki (10) Patent No.: US 9,889,767 B2
(45) Date of Patent: Feb. 13, 2018

(54) CONTROL DEVICE FOR ELECTRIC ROTARY MACHINE

(71) Applicant: DENSO CORPORATION, Kariya, Aichi-pref. (JP)

(72) Inventor: Shingo Kawasaki, Kariya (JP)

(73) Assignee: DENSO CORPORATION, Kariya (JP)

(*) Notice: Subject to any disclaimer, the term of this patent is extended or adjusted under 35 U.S.C. 154(b) by 338 days.

(21) Appl. No.: 14/686,223

(22) Filed: Apr. 14, 2015

(65) Prior Publication Data

US 2015/0291059 A1    Oct. 15, 2015

(30) Foreign Application Priority Data

Apr. 15, 2014    (JP) ................................. 2014-083425

(51) Int. Cl.
*B60L 15/20* (2006.01)
*B60W 10/06* (2006.01)
(Continued)

(52) U.S. Cl.
CPC .............. *B60L 15/20* (2013.01); *B60L 11/14* (2013.01); *B60L 11/1861* (2013.01);
(Continued)

(58) Field of Classification Search
CPC ............. B60K 2006/4825; B60L 11/14; B60L 11/1861; B60L 15/20; B60L 2210/40; B60L 2220/14; B60L 2240/12; B60L 2240/421; B60L 2240/423; B60L 2240/441; B60L 2240/443; B60L 2240/80; B60L 2260/26; B60L 2270/145; B60W 20/00; B60W 30/184; B60W 2050/001;
(Continued)

(56) References Cited

U.S. PATENT DOCUMENTS

2003/0100404 A1* 5/2003 Matsumura ........... B60W 10/02
477/124
2008/0020897 A1* 1/2008 Honma ................. F16H 61/061
477/149
(Continued)

FOREIGN PATENT DOCUMENTS

JP    2002-27611    1/2002

*Primary Examiner* — Thomas G Black
*Assistant Examiner* — Ce Li
(74) *Attorney, Agent, or Firm* — Nixon & Vanderhye P.C.

(57) ABSTRACT

A MGECU in a control device mounted on a vehicle has a feedback control section, a correction torque calculation section, an instruction torque calculation section. The feedback control section calculates a torque to be used for performing a feedback control of an actual rotation speed to follow a target rotation speed. The correction torque calculation section calculates a correction torque based on a change rate of the target rotation speed and inertia of a rotary body which includes the motor generator. When the target rotation speed is changed to decrease a difference between the target rotation speed and the actual rotation speed, the correction torque calculation section reduces the correction torque. The instruction torque calculation section adds the torque calculated by the feedback control section and the correction torque calculated by the correction torque calculation section in order to obtain the instruction torque to be used for the motor generator.

5 Claims, 8 Drawing Sheets

(51) Int. Cl.
  *B60W 20/00* (2016.01)
  *B60W 30/184* (2012.01)
  *B60L 11/14* (2006.01)
  *B60L 11/18* (2006.01)
  *B60K 6/48* (2007.10)
  *B60W 50/00* (2006.01)

(52) U.S. Cl.
  CPC .......... *B60W 20/00* (2013.01); *B60W 30/184* (2013.01); *B60K 2006/4825* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/80* (2013.01); *B60L 2260/26* (2013.01); *B60L 2270/145* (2013.01); *B60W 2050/001* (2013.01); *B60W 2510/0216* (2013.01); *B60W 2510/083* (2013.01); *B60W 2510/088* (2013.01); *B60W 2710/081* (2013.01); *B60W 2710/082* (2013.01); *B60W 2710/083* (2013.01); *Y02T 10/6252* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01); *Y10S 903/906* (2013.01); *Y10S 903/93* (2013.01)

(58) Field of Classification Search
  CPC ... B60W 2510/0216; B60W 2510/083; B60W 2510/088; B60W 2710/081; B60W 2710/082; B60W 2710/083; Y10S 903/906; Y10S 903/93; Y02T 10/70; Y02T 10/6252; Y02T 10/7077; Y02T 10/7044; Y02T 10/7005; Y02T 10/705
  See application file for complete search history.

(56) References Cited

U.S. PATENT DOCUMENTS

| | | | |
|---|---|---|---|
| 2008/0096721 A1* | 4/2008 | Honma | F16H 61/0437 477/120 |
| 2008/0153661 A1* | 6/2008 | Shibata | B60K 6/445 477/3 |
| 2010/0160111 A1* | 6/2010 | Yamanaka | F16H 61/66272 477/45 |
| 2010/0250037 A1* | 9/2010 | Yoshida | B60K 6/365 701/22 |
| 2013/0012353 A1* | 1/2013 | Yoshida | B60K 6/48 477/5 |
| 2014/0045649 A1* | 2/2014 | Yoshida | B60K 6/48 477/5 |

* cited by examiner

CONTROL DEVICE FOR ELECTRIC ROTARY MACHINE

CROSS-REFERENCE TO RELATED APPLICATION

This application is related to and claims priority from Japanese Patent Application No. 2014-83425 filed on Apr. 15, 2014, the contents of which are hereby incorporated by reference.

BACKGROUND OF THE INVENTION

1. Field of the Invention

The present invention relates to control devices capable of controlling electric rotary machines as a drive power source of motor vehicles.

2. Description of the Related Art

For example, a patent document, Japanese patent laid open publication No. 2002-27611 shows a control device for controlling such an electric rotary machine. The control device is applied to a motor vehicle equipped with an electric rotary machine and an internal combustion engine which are used as drive power sources of a motor vehicle. This control device instructs the electric rotary machine to increase its generated torque when receiving a start request to start the internal combustion engine while the motor vehicle drives by the power of the electric rotary machine. In more detail, the control device increases the output torque of the electric rotary machine by a torque which is obtained by adding a motoring torque and an inertia torque together. The motoring torque is determined on the basis of a target rotation speed of the internal combustion engine, and the inertia torque corresponds to a change rate of the rotation speed of the internal combustion engine.

By the way, there is another type of the control device capable of calculating an instruction torque, to be supplied to an electric rotary machine, on the basis of the target rotation speed of the electric rotary machine, and which drives the electric rotary machine on the basis of the calculated instruction torque. This instruction torque is adjusted on the basis of a correction torque which is calculated on the basis of the change rate of the target rotation speed of the electric rotary machine per predetermined time, and the inertia of a rotary body which contains the electric rotary machine. This makes it possible to improve the followability of an actual rotation speed of the electric rotary machine to the target rotation speed.

When the instruction torque is limited in the control device performing the rotation speed control on the basis of the target rotation speed, it becomes difficult for the actual rotation speed of the electric rotary machine to follow the target rotation speed. This increases a difference between the target rotation speed and the actual rotation speed of the electric rotary machine. After this, when the target rotation speed is adjusted to decrease the difference between the target rotation speed and the actual rotation speed of the electric rotary machine, there is a possible problem for the correction torque obtained on the basis of the charge rate of the target rotation speed to be significantly deviated from its optimal value. This case would cause that the actual rotation speed to be significantly separated from the target rotation speed of the electric rotary machine.

SUMMARY

It is therefore desired to provide a control device of an electric rotary machine capable of effectively suppressing and avoiding reduction of controllability of a rotation speed of an electric rotary machine.

An exemplary embodiment provides a control device for an electric rotary machine according to an exemplary embodiment of the present invention. The electric rotary machine is used as a drive power source of a motor vehicle. The control device has an instruction torque calculation means, a correction torque calculation means, a correction means, a drive means and a correction rate correction means. The instruction torque calculation means calculates an instruction torque of the electric rotary machine on the basis of a target rotation speed of the electric rotary machine. The correction torque calculation means calculates a correction torque in order for an actual rotation speed of the electric rotary machine to follow the target rotation speed on the basis of a change rate of the target rotation speed per predetermined time and an inertia of a rotary body consisting of the electric rotary machine. The correction means corrects the instruction torque by using the correction torque calculated by the correction torque calculation means. The drive means drives the electric rotary machine on the basis of the instruction torque which has been corrected by the correction means. The correction rate correction means decrease the correction torque which is used for correcting the instruction torque, when the target rotation speed changes to decrease a difference between the target rotation speed and the actual rotation speed.

In a case in which the target rotation speed of the electric rotary machine is changed to decrease a difference between the target rotation speed and the actual rotation speed of the electric rotary machine, there is a possible case in which the correction torque calculated by the correction torque calculation means becomes an insufficient torque in order to follow the target rotation speed of the electric rotary machine. In order to solve this, the control device for the electric rotary machine having the structure previously described is equipped with the correction rate correction means. Accordingly, when the target rotation speed of the electric rotary machine is changed to decrease the difference previously described, the correction amount correction means decreases the correction torque to be applied to the instruction torque. This makes it possible to suppress an excessive correction to the instruction torque, and prevent the actual rotation speed of the electric rotary machine from significantly deviating from the target rotation speed. As a result, it is possible to effectively suppress reduction of the controllability of the rotation speed of the electric rotary machine.

DETAILED DESCRIPTION OF THE PREFERRED EMBODIMENTS

First Exemplary Embodiment

A description will be given of the control device for an electric rotary machine according to a first exemplary embodiment. The concept of the control device according to the present invention is applied to a motor vehicle equipped with main engines such as an electric rotary machine and an internal combustion engine.

Figure 1:
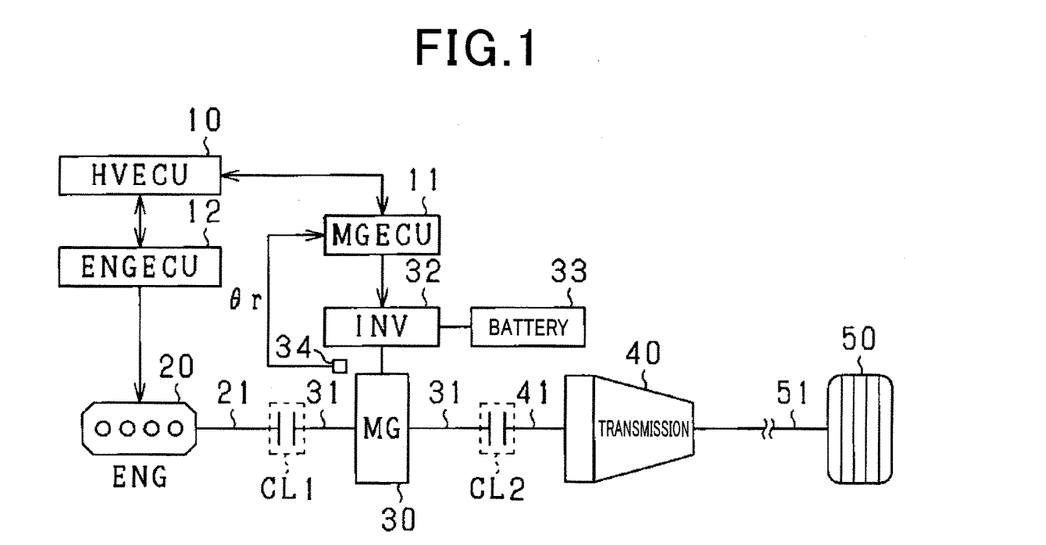
FIG. 1 is a view showing an overall structure of a motor control system equipped with a control device for an electric rotary machine according to a first exemplary embodiment of the present invention.

As shown in FIG. 1, a motor vehicle is equipped with a HVECU (hybrid vehicle ECU) 10, a MGECU (motor generator ECU) 11, an ENGECU (engine ECU) 12, an internal combustion engine 20, a motor generator 30 as an electric rotary machine, a transmission 40, and wheels 50.

The motor vehicle uses the internal combustion engine 20 and the motor generator 30 as a drive power source. A first clutch CL1 is connected to a rotary shaft 31 of the motor generator 30 at the internal combustion engine 20 side. The first clutch CL1 provides an engagement state and a disengagement state. That is, in the engagement state of the first clutch CL1, the rotary shaft 31 of the motor generator 30 engages with an output shaft 21 of the internal combustion engine 20 through the first clutch CL1. In the disengagement state of the first clutch CL1, the rotary shaft 31 of the motor generator 30 disengages from the output shaft 21 of the internal combustion engine 20.

The rotary shaft 31 of the motor generator 30 at the transmission 40 side is connected to a second clutch CL2.

The second clutch CL2 also provides an engagement state and a disengagement state. In the engagement state of the second clutch CL2, an input shaft 41 of the transmission 40 engages with the rotary shaft 31 of the motor generator 30 through the second clutch CL2. In the disengagement state of the second clutch CL2, the input shaft 41 of the transmission 40 disengages from the rotary shaft 31 of the motor generator 30. It is possible to use a permanent magnet synchronous motor as the motor generator 30. In the first exemplary embodiment, the first clutch CL1 corresponds to a clutch means.

The motor generator 30 as the electric rotary machine has two functions, an electric motor and an electric generator. When receiving electric power of a battery 33 through an inverter 32, the motor generator 30 acts as the electric motor. On the other hand, when receiving a drive power transmitted from the internal combustion engine 20 or an axle 51 of the motor vehicle, the motor generator 30 acts as the electric generator.

The electric power generated by the motor generator 30 is supplied to the battery 33 through the inverter 32. The battery 33 is charged by the electric power generated by and supplied from the motor generator 30.

When the motor generator 30 acts as the electric motor and the second clutch CL2 provides the engagement state, i.e. the input shaft 41 of the transmission 40 engages with the rotary shaft 31 of the motor generator 30, the torque generated by the motor generator 30 is supplied to the input shaft 41 of the transmission 40 through the second clutch CL2.

When each of the first clutch CL1 and the second clutch CL2 provides the engagement state, the internal combustion engine 20 generates and provides the torque to the input shaft 41 of the transmission 40 through the first clutch CL1, the motor generator 30 and the second clutch CL2. When receiving the torque generated by and transmitted from the internal combustion engine 20, the transmission 40 converts the received torque to a torque on the basis of a transmission gear ratio of the transmission 40. The transmission 40 transmits the converted torque to the wheels 50 through the axle 51. That is, the wheels 50 are driven by at least one of the torque generated by the motor generator 30 and the torque generated by the internal combustion engine 20.

Each of the HVECU 10, the MGECU 11 and the ENGECU 12 is a microcomputer equipped with a CPU, a ROM, a RAM, a I/O, etc. The CPU performs one or more programs stored in the ROM.

The HVECU 10 is a control device at the upper side of the MGECU 11 and the ENGECU 12. The HVECU 10 is an upper side device in hierarchy of the microcomputer rather than the MGECU 11 and the ENGECU 12. In other words, the HVECU 10 performs the entire control of the control device according to the first exemplary embodiment.

The HVECU 10 performs bidirectional communication with each of the MGECU 11 and the ENGECU 12.

The HVECU 10 receives detection signals transmitted from the acceleration pedal, etc. of the motor vehicle, and calculates a target value to control the operation of each of the motor generator 30 and the internal combustion engine 20 on the basis of the received detection signals, and outputs the generated target values to each of the MGECU 11 and the ENGECU 12.

The MGECU 11 is a control device to control the operation of the motor generator 30. The MGECU 11 receives a target rotation speed Ntgt as a control value of the motor generator 30 transmitted from the HVECU 10. Further, the MGECU 11 receives a detection signal transmitted from a rotation angle sensor 34 (for example, a resolver). The rotation angle sensor 34 detects a rotation angle (electric angle) of the motor generator 30, and transmits the detection signal corresponding to the detected rotation angle to the MGECU 11. The MGECU 11 operates the inverter 32 on the basis of the received target rotation speed Ntgt and the received detection signal of the rotation angle sensor 34 so that the actual rotation speed of the motor generator 30 approaches the target rotation speed Ntgt. Further, when receiving a start request to start the operation of the internal combustion engine 20 transmitted from the HVECU 10, the MGECU 11 operates the inverter 32 in order for the motor generator 30 to generate the drive power necessary for starting the internal combustion engine 20.

The ENGECU 12 is a control device capable of controlling the operation of the internal combustion engine 20.

When receiving a target value as the control value (for example, a combustion torque) transmitted from the HVECU 10, the ENGECU 12 performs the combustion control, i.e. instructs the fuel injection valve arranged at each of cylinders of the internal combustion engine 20 to adjust its fuel injection amount on the basis of the received target value.

Figure 2:
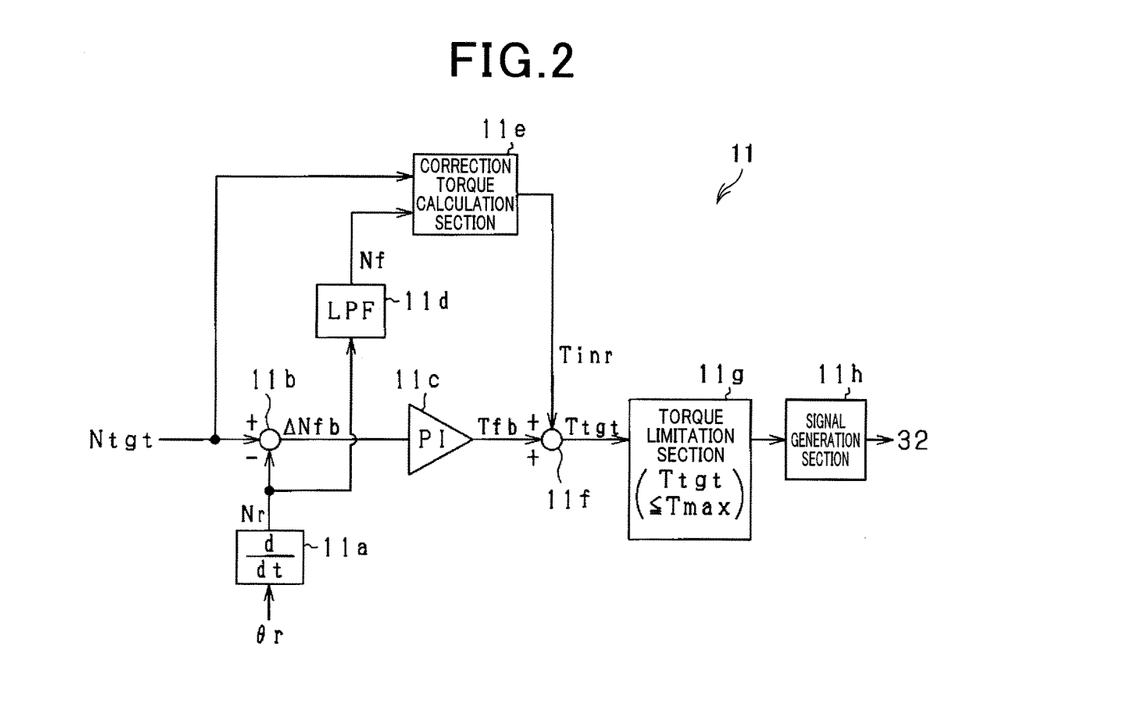
FIG. 2 is a block diagram showing a control of the electric rotary machine performed by the control device for an electric rotary machine according to the first exemplary embodiment shown in FIG. 1.

A description will be given of the rotation speed control of the motor generator 30 performed by the MGECU 11 with reference to the block diagram shown in FIG. 2.

A rotation speed calculation section 111a calculates an actual rotation speed Nr of the motor generator 30 on the basis of the rotation angle θr detected by the rotation angle sensor 34. A difference calculation section 11b subtracts the actual rotation speed Nr from the target rotation speed Ntgt to calculate a rotation speed difference ΔN.

A feedback control section 11c calculates a feedback torque Tfb on the basis of the rotation speed difference ΔN calculated by the difference calculation section 11b. This feedback torque Tfb is an operation value to be used by the feedback control for adjusting the actual rotation speed Nr to the target rotation speed Ntgt. Specifically, the feedback control section 11c performs a proportional integral control to calculate the feedback torque Tfb which inputs the rotation speed difference ΔN. A positive torque of the motor generator 30 increases the rotation speed of the motor generator 30, and a negative torque of the motor generator 30 decreases the rotation speed of the motor generator 30. In the control device according to the first exemplary embodiment, the feedback control section 11c corresponds to an instruction torque calculation means.

A filter 11d removes a noise component from the actual rotation speed Nr. In the structure of the control device according to the first exemplary embodiment, the filter 11d consists of a low pass filter (for example, a first order lag element). The noise component contains noise contained in the detection signal of the rotation angle sensor 34 and fluctuation of the actual rotation speed Nr due to external fluctuation applied to the motor generator 30. The fluctuation of the actual rotation speed Nr due to the external fluctuation contains fluctuation of the actual rotation speed Nr due to the combustion of the internal combustion engine 20.

A correction torque calculation section 11e calculates a correction torque Tinr on the basis of the target rotation speed Ntgt and the actual rotation speed Nf from which a fluctuation component such as noise has been removed by the filter 11d.

The correction torque Tinr is a feedforward operation value in order for the actual rotation speed Nr to follow the target rotation speed Ntgt. In the structure of the control device according to the first exemplary embodiment, the correction torque calculation section 11e corresponds to a correction torque calculation means. The structure and action of the correction torque calculation section 11e will be explained later in detail.

An instruction torque calculation section 11f adds the feedback torque Tfb calculated by the feedback control section 11c and the correction torque Tinr calculated by the correction torque calculation section 11e in order to calculate the instruction torque Ttgt. In the control device according to the first exemplary embodiment, the instruction torque calculation section 11f corresponds to a correction means.

A torque limitation section 11g limits the instruction torque Ttgt calculated by the instruction torque calculation section 11f by using a maximum torque Tmax. In more detail, when the instruction torque Ttgt is not more than the maximum torque Tmax, the torque limitation section 11g outputs the instruction torque Ttgt calculated by the instruction torque calculation section 11f to a signal generation section 11h. On the other hand, when the instruction torque Ttgt is more than the maximum torque Tmax, the torque limitation section 11g outputs the maximum torque Tmax as the instruction torque Ttgt to the signal generation section 11h. There is a possible case in which the torque limitation section 11g outputs a negative value of the instruction torque Ttgt instead of a positive value thereof.

When becoming a negative value of the instruction torque Ttgt, the torque limitation section 11g outputs a minimum torque Tmin (<0) as the instruction torque Ttgt. The maximum torque Tmax and the minimum torque Tmin are determined in advance due to a state of charge of the battery 33. In the control device according to the first exemplary embodiment, the torque limitation section 11g corresponds to a limitation means.

A signal generation section 11h generates operation signals in order to operate switching elements forming the inverter 32 on the basis of the instruction torque Ttgt transmitted from the torque limitation section 11g. It is sufficient for the signal generation section 11h to generate these operation signals by using a current vector control which is well known.

The signal generation section 11h generates and outputs the operation signals to the inverter 32 in order to adjust the torque to generated by the motor generator 30 to the instruction torque Tgt. In the control device according to the first exemplary embodiment, the signal generation section 11h corresponds to a drive means.

A description will now be given of the process of calculating a correction torque by the correction torque calculation section 11e with reference to FIG. 3.

The MGECU 11 having the correction torque calculation section 11e repeatedly performs this process at a predetermined interval.

Figure 3:
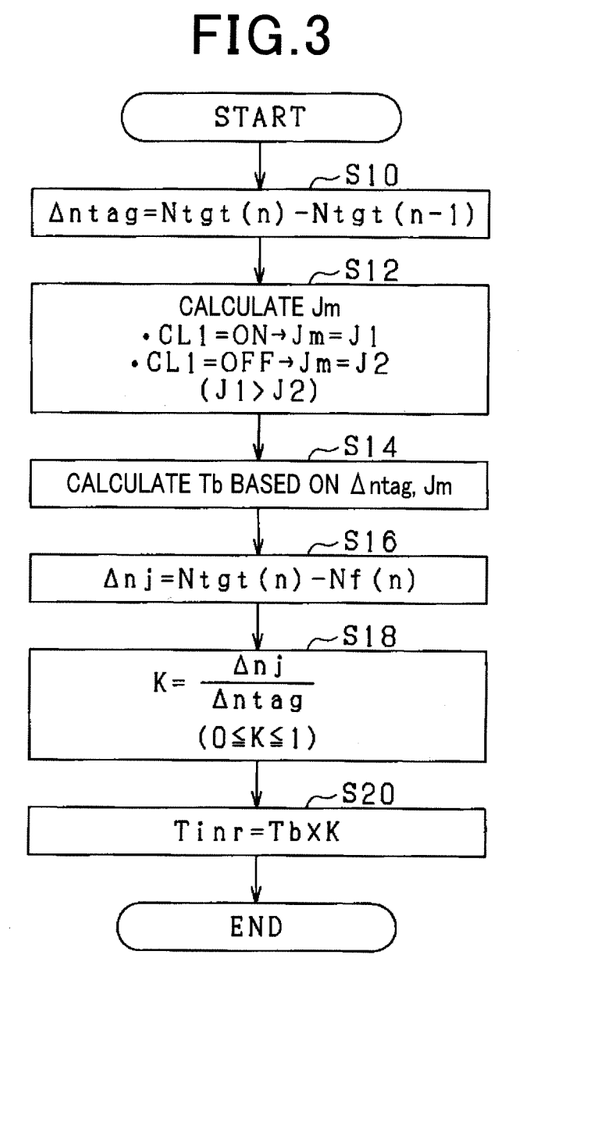
FIG. 3 is a flow chart showing a correction torque calculation process performed by the control device for an electric rotary machine according to the first exemplary embodiment shown in FIG. 1.

In step S10 shown in FIG. 3, a change rate (target rotation speed change rate Δntag) of the target rotation speed Ntgt in the calculation period ΔT of the MGECU 11 is calculated. Specifically, the target rotation speed change rate Δntag is calculated by subtracting the target rotation speed Ntgt (n−1) at the previous calculation timing from the target rotation speed Ntgt (n) at a current calculation timing. The operation flow goes to step S12.

In step S12, inertia Jm of the rotary body including the motor generator 30 is calculated. In the control device according to the first exemplary embodiment, it is determined that the inertia J1 in the engagement state of the first clutch CL1 is larger than the inertia J2 in the disengagement state of the first clutch CL1. This can be clearly understood on the basis of the following state. That is, the rotary body is a combination of the motor generator 30 and the internal combustion engine 20 during the engagement state of the first clutch CL1, and the rotary body has the motor generator 30 only in the disengagement state of the first clutch CL1. In the control device according to the first exemplary embodiment, the process in step S12 corresponds to a switching means.

In step S14, a base value (base torque Tb) of the correction torque is calculated on the basis of the target rotation speed change rate Δntag and the inertia Jm in order for the actual rotation speed Nr to follow the target rotation speed Ntgt. Specifically, this base torque Tb is calculated using the calculation period ΔT by the following equation (eq1).

$$Tb = Jm \times \Delta ntag \times (2\pi/60)/\Delta T \quad \text{(eq1)}.$$

In step S16, a judgment difference Δnj is calculated by subtracting the actual rotation speed Nf(n) (from which the noise component has been removed by the filter 11d) at the current time from the target rotation speed Ntgt (n) at the current time.

This actual rotation speed Nf(n) is the actual rotation speed of the motor generator 30 from which noise has been removed by the filter 11d.

In step S18, a reflection coefficient K is calculated by dividing the judgment difference Δnj by the target rotation speed change rate Δntag. In the control device according to the first exemplary embodiment, the process in step S18 corresponds to a reflection coefficient setting means. A description will now be given of the reflection coefficient K with reference to FIG. 4A to FIG. 4C.

Figure 4A:
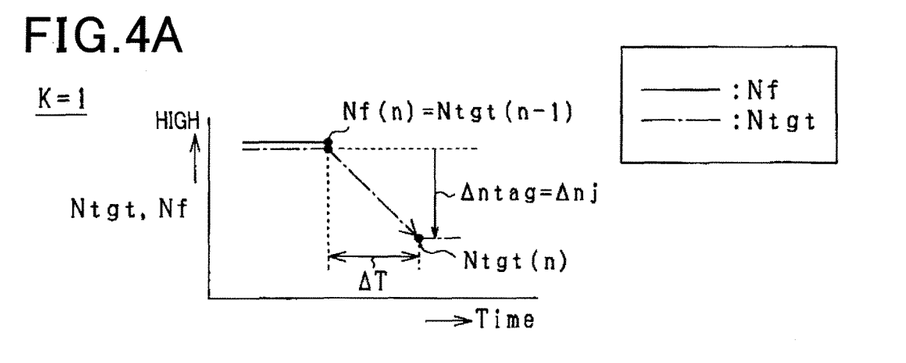
FIG. 4A to FIG. 4C are views explaining a process of correcting a correction torque performed by the control device for an electric rotary machine according to the first exemplary embodiment shown in FIG. 1.

FIG. 4A shows a case in which the target rotation speed Ntgt is changed to separate from the actual rotation speed Nf from which the noise component has been removed by the filter 11d.

FIG. 4A shows a case in which the target rotation speed Ntgt (n−1) previously calculated and the actual rotation speed Nf (n) currently obtained are on the same time axis. This means that the actual rotation speed Nf (n) has been calculated on the basis of the target rotation speed Ntgt (n−1) previously calculated. For this reason, the actual rotation speed Nf (n) currently obtained is brought forward by the calculation period ΔT on the time axis from the target rotation speed Ntgt (n−1) previously calculated.

FIG. 4A shows that the target rotation speed Ntgt (n−1) is equal to the actual rotation speed Nf (n). In this case shown in FIG. 4A, the absolute value of the target rotation speed change rate Δntag is equal to the absolute value of the judgment difference Δnj. Further, the target rotation speed change rate Δntag and the judgment difference Δnj have the same sign. The reflection coefficient K is therefore set to a value of 1.

When the target rotation speed Ntgt is changed to separate from the actual rotation speed Nf, there is a possible case in which the reflection coefficient K becomes more than the value of 1. However, the control device according to the first exemplary embodiment performs the upper limitation value guard process to use the reflection coefficient K of 1 when the calculated reflection coefficient K becomes more than 1.

Figure 4B:
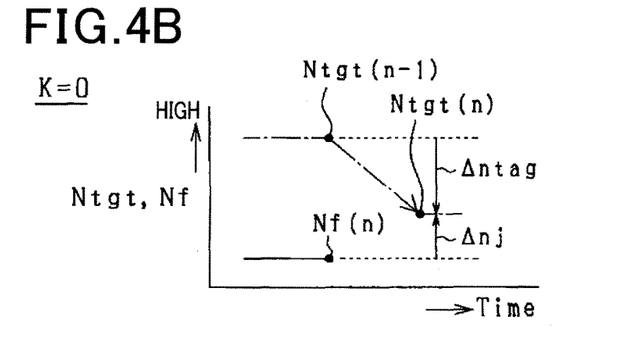

FIG. 4B shows a case in which the target rotation speed Ntgt approaches the actual rotation speed Nf. That is, FIG. 4B shows the case in which the target rotation speed Ntgt (n−1) previously calculated is separated from the actual rotation speed Nf (n) currently obtained through the target rotation speed Ntgt (n) currently calculated. In this case, the target rotation speed change rate Δntag and the judgment difference Δnj have a different sign to each other. For this reason, the reflection coefficient K becomes a negative value. However, the control device according to the first exemplary embodiment performs the lower limitation value guard process which uses the reflection coefficient K of zero when the calculated reflection coefficient K becomes less than zero.

Figure 4C:
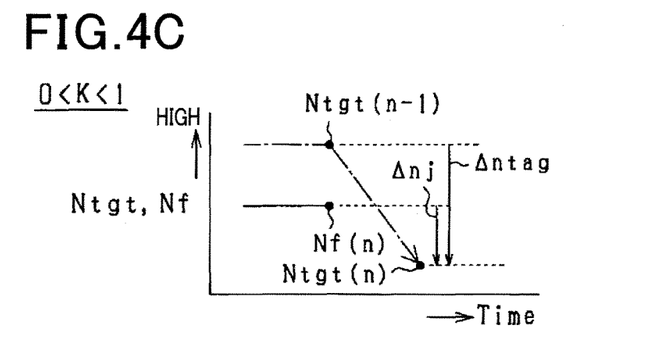

FIG. 4C shows a case in which the target rotation speed Ntgt (n−1) previously calculated and the actual rotation speed Nf (n) currently obtained are higher than the target rotation speed Ntgt (n) currently calculated, and the target rotation speed Ntgt (n−1) previously calculated is higher than the actual rotation speed Nf (n) currently obtained. In this case, the target rotation speed change rate Δntag and the judgment difference Δnj have the same sign. The absolute value of the target rotation speed change rate Δntag is higher than the absolute value of the judgment difference Δnj. The reflection coefficient K is therefore more than zero and less than 1.

In step S20 shown in FIG. 3, the correction torque Tinr is calculated by multiplying the base torque Tb obtained in step S14 by the reflection coefficient K. In the control device according to the first exemplary embodiment, the process in step S20 corresponds to a correction rate correction means.

Figures 5A, 5B, 5C:
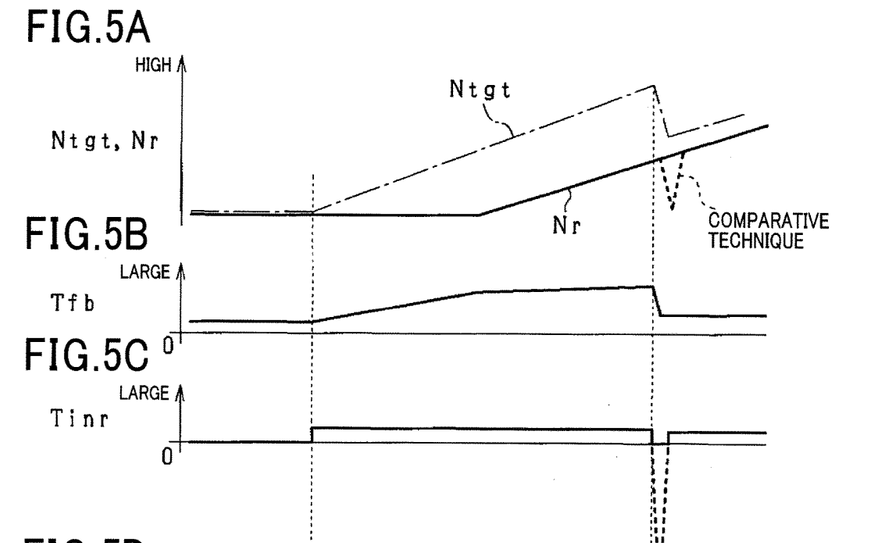
FIG. 5A to FIG. 5D are timing charts showing the process of correcting the correction torque performed by the control device for an electric rotary machine according to the first exemplary embodiment shown in FIG. 1.
Figure 5D:
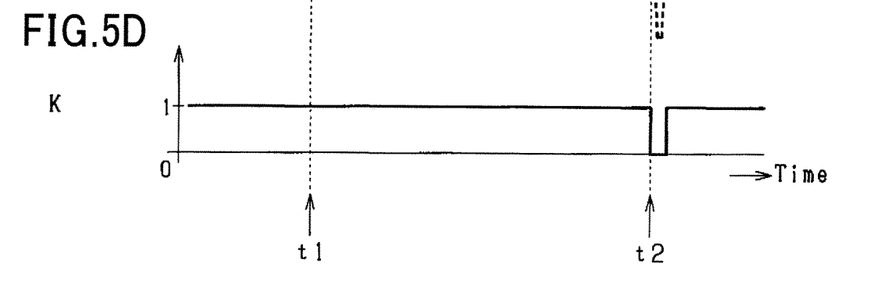

FIG. 5A to FIG. 5D show the effects of the control device according to the first exemplary embodiment. In more detail, FIG. 5A shows a transition of each of the target rotation speed Ntgt and the actual rotation speed Nf. FIG. 5B shows a transition of the feedback torque Tfb. FIG. 5C shows a transition of the correction torque Tinr. FIG. 5D shows a transition of the reflection coefficient K.

In the case shown in FIG. 5A to FIG. 5D, the target rotation speed Ntgt starts to rise at the timing t1. After this, the actual rotation speed Nr is greatly separated from the target rotation speed Ntgt because the instruction torque calculation section 11f limits the instruction torque Ttgt. At the timing t2, although the target rotation speed Ntgt is changed to approach the actual rotation speed Nr, the reflection coefficient K is set to zero. This makes it possible to avoid the deterioration of controllability of the actual rotation speed Nr of the motor generator 30.

On the other hand, in a comparative technique (as a conventional example) which does not use any reflection coefficient K and uses the base torque Tb as the correction torque Tinr, as designated by the dotted line in the drawings, the absolute value of the correction torque Tinr excessively increases at a timing immediately after the timing t2. As a result, this causes a problem in which the actual rotation speed Nr is significantly decreased largely the target rotation speed Ntgt.

As previously described in detail, the control device according to the first exemplary embodiment has the following effects.

(1) The correction torque Tinr is calculated by multiplying the feedback torque Tfb by the reflection coefficient K. This makes it possible to suppress the actual rotation speed Nr from being greatly separated from the target rotation speed Ntgt, and suppress deterioration of controllability of the actual rotation speed Nr of the motor generator 30.

In particular, the control device according to the exemplary embodiment calculates the reflection coefficient K by using the method previously explained in step S18 shown in FIG. 3. This method can correct the correction torque Tinr with high accuracy under the condition shown in FIG. 4C previously described.

(2) When the reflection coefficient K is more than 1, the upper limitation value guard process is performed to limit the reflection coefficient K by 1. When the reflection coefficient K exceeds 1, the correction torque Tinr becomes an excessive value, and causes a torque shock, etc. of the motor generator 30. The execution of the upper limitation value guard process makes it possible to avoid such a problem.

(3) The reflection coefficient K is obtained on the basis of the actual rotation speed Nf from which fluctuation components as noise have been removed by the filter 11d. This makes it possible to increase the setting accuracy of the reflection coefficient K, and suppress decreasing of controllability of a rotation speed of the motor generator with high efficiency.

Second Exemplary Embodiment

A description will be given of the control device for an electric rotary machine according to a second exemplary embodiment. A to difference between the control device according to the second exemplary embodiment and the control device according to the first exemplary embodiment will be explained with reference to drawings. As shown by the flow chart in FIG. 6, the control device according to the second exemplary embodiment uses another method of setting the reflection coefficient K. The same processes between the flow chart shown in FIG. 6 and the flow chart shown in FIG. 3 will be refereed with the same step numbers for brevity.

Figure 6:
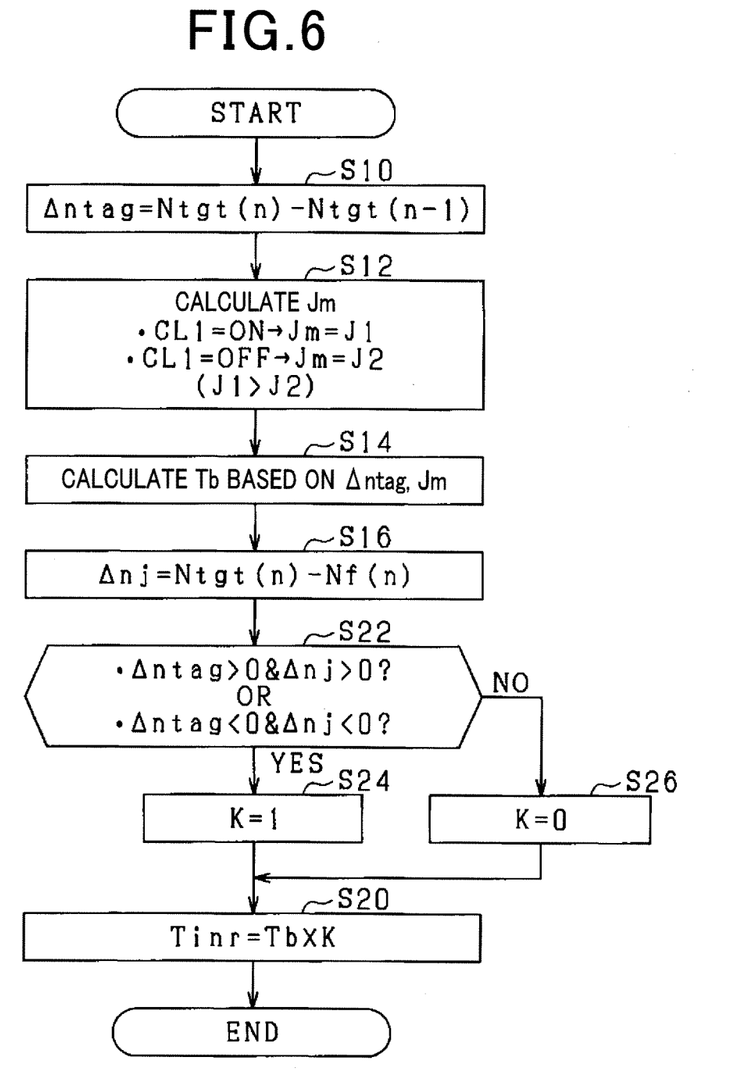
FIG. 6 is a flow chart showing the correction torque calculation process performed by the control device for an electric rotary machine according to a second exemplary embodiment of the present invention.

After completion of the process in step S16, the operation flow goes to step S22. In step S22, it is judged that whether a logical sum of a condition in which each of the target rotation speed change rate Δntag and the judgment difference Δnj is a positive value, and condition in which each of the target rotation speed change rate Δntag and the judgment difference Δnj has a negative value is true or not. This process is used for determining whether it is necessary to adjust the correction torque Tinr.

When the detection result in step S22 indicates affirmation, it can be recognized that the target rotation speed Ntgt is changed to be separated from the actual rotation speed Nf, the operation flow goes to step S24. In step S24, the reflection coefficient K is set to 1. On the other hand, when the detection result in step S22 indicates negation, it can be recognized that the target rotation speed Ntgt is changed to approach the actual rotation speed Nf, the operation flow goes to step S26. In step S26, the reflection coefficient K is set to 0. That is, it is inhibited to adjust the correction torque Tinr. After completion of the process in step S24 or step S26, the operation flow goes to step S20.

As previously described, the control device according to the second exemplary embodiment uses the reflection coefficient K of either 1 or 0. This process of correcting the torque performed by the control device according to the second exemplary embodiment makes it to possible to obtain approximately the same effect of the process performed by the control device according to the first exemplary embodiment previously described.

Third Exemplary Embodiment

Figure 7:
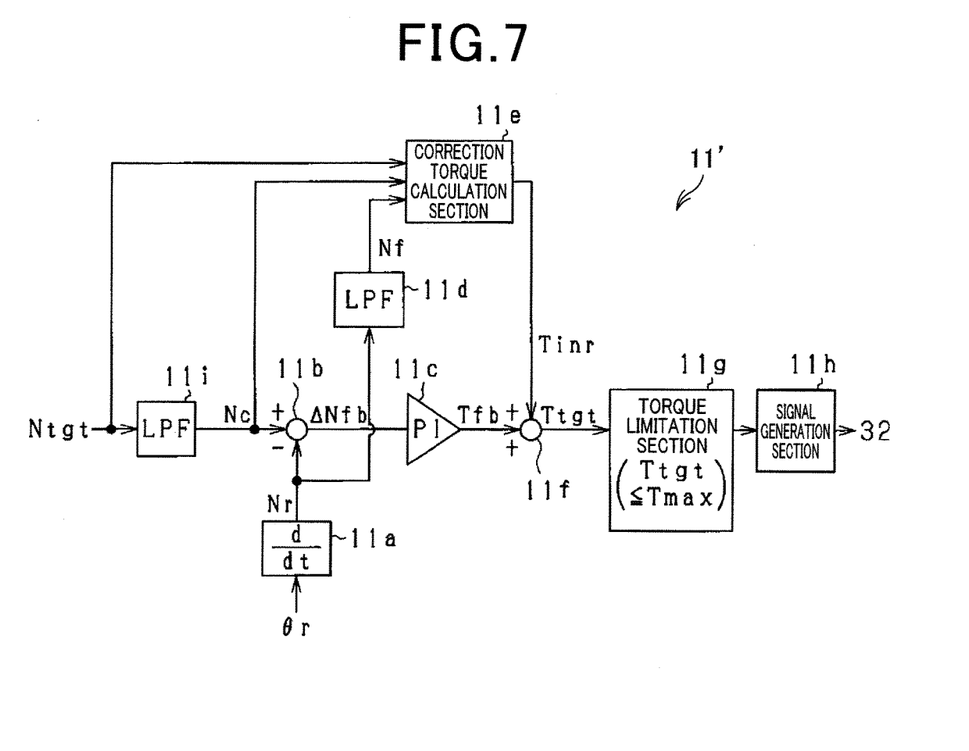
FIG. 7 is a block diagram showing the motor control performed by the control device for an electric rotary machine according to a third exemplary embodiment of the present invention.

A description will be given of the control device for an electric rotary machine according to a third exemplary embodiment. A difference between the control device according to the third exemplary embodiment and the control device according to the first exemplary embodiment will be explained with reference to drawings. In the third exemplary embodiment, the MGECU 11' having the structure shown in FIG. 7 performs the control method of adjusting the rotation speed of the motor generator 30 as an electric rotary machine. In FIG. 7, the same structure and processes of the MGECU 11 shown in FIG. 2 previously described will be referred to as the same reference characters for brevity. In the MGECU 11' of the control device according to the present exemplary embodiment, the filter 11d is called to as a first filter.

A second filter 11i inputs the target rotation speed Ntgt. In the control device for an electric rotary machine according to the third exemplary embodiment, the second filter 11i consists of a low pass filter (for example, a first order lag element). For this reason, the second filter 11i calculates an instruction rotation speed Nc by a low-pass filter process. The difference calculation section 11b and the correction torque calculation section 11e input the instruction rotation speed Nc supplied from the second filter 11i. In the present exemplary embodiment, the second filter 11i corresponds to an instruction value calculation means.

A description will now be given of the correction torque calculation process by the correction torque calculation section 11e in the MGECU 11' shown in FIG. 7 with reference to FIG. 8.

Figure 8:
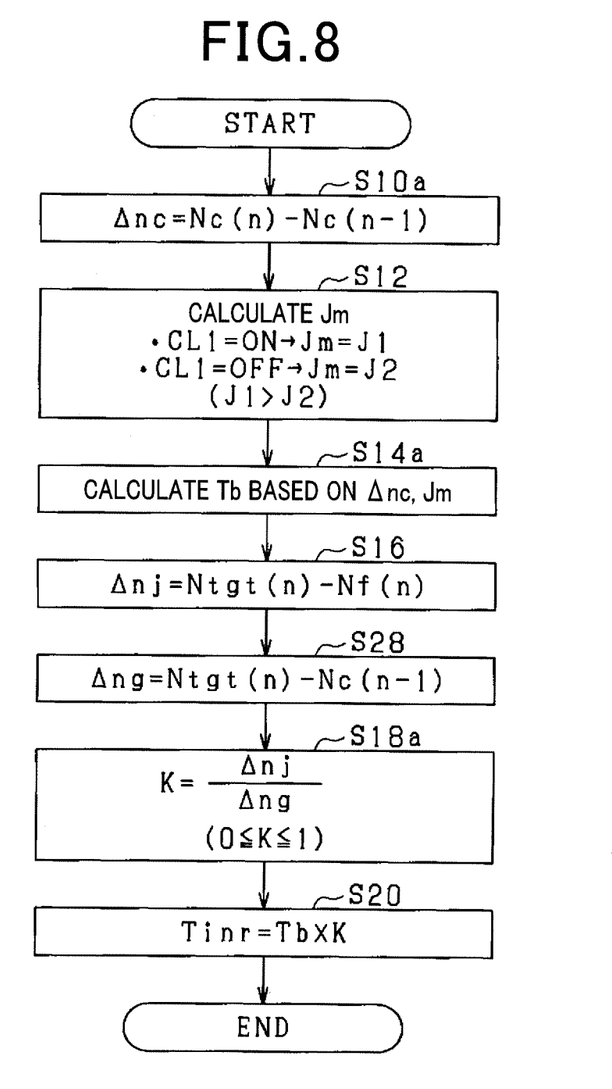
FIG. 8 is a flow chart showing the correction torque calculation process performed by the control device for an electric rotary machine according to the third exemplary embodiment shown in FIG. 7.

The MGECU 11' repeatedly performs this process shown in FIG. 8 at a predetermined interval. In the flow chart shown in FIG. 8, the same process in the flow chart shown in FIG. 3 will be referred with the same process step numbers.

In step S10a, an instruction rotation speed change rate Δnc is calculated by subtracting an instruction rotation speed Nc (n−1) previously obtained from a current instruction rotation speed Nc (n) currently calculated.

After completion of the process in step S10a, the operation flow goes to step S14a through the step S12. In step S14a, the basic torque Tb is calculated in order for the actual rotation speed Nr to follow the instruction rotation speed Nc on the basis of the instruction rotation speed change rate Δnc and the inertia Jm. It is sufficient to calculate the basic torque Tb on the basis of the equation (eq1) in which Δnc is used as Δntag.

After completion of step S14a, the operation flow goes to step S16, and then goes to step S28.

Figure 9A:
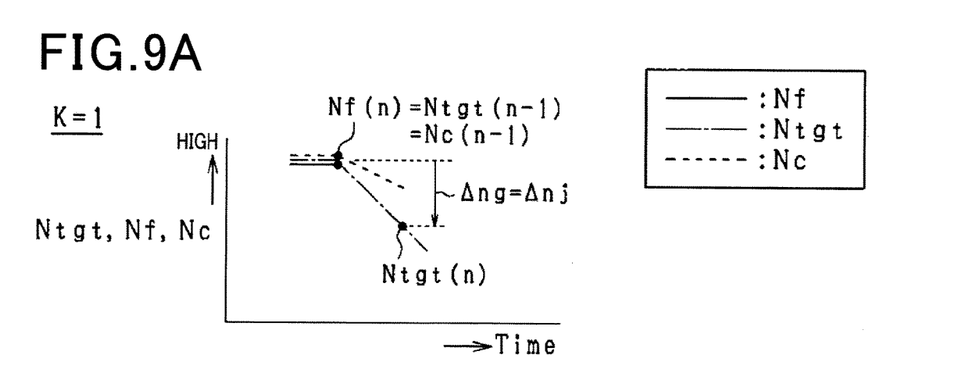
FIG. 9A to FIG. 9C are views explaining the process of correcting the correction torque performed by the control device for an electric rotary machine according to the third exemplary embodiment shown in FIG. 7.
Figure 9B:
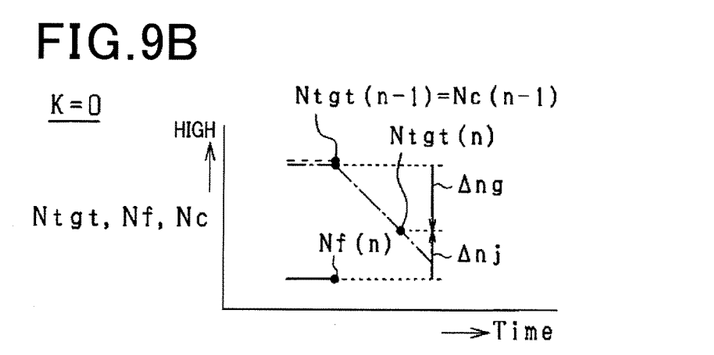
Figure 9C:
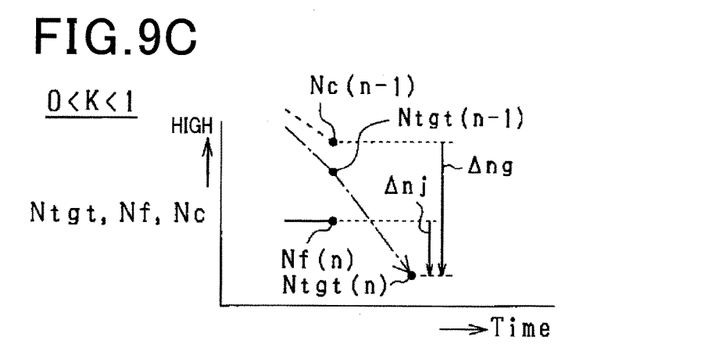

In step S28, a regulated rotation speed change rate Δng is calculated by subtracting the instruction rotation speed Nc (n−1) previously obtained from the current instruction rotation speed Nc (n). In step S18a, the reflection coefficient K is calculated by dividing the judgment difference Δnj by the regulated rotation speed change rate Δng. A description will be given of the reflection coefficient K with reference to FIG. 9A to FIG. 9C. FIG. 9A to FIG. 9C correspond to FIG. 4A to FIG. 4C, respectively, previously explained.

FIG. 9A shows a case in which the target rotation speed Ntgt (n−1) and the instruction rotation speed Nc(n−1) previously obtained, and the current actual rotation speed Nf (n) are equal to each other. In this case, the absolute value of the regulated rotation speed change rate Δng is equal to the absolute value of the judgment difference Δnj. In addition, because the regulated rotation speed change rate Δng and the judgment difference Δnj have the same sign, the reflection coefficient K is set to 1.

FIG. 9B shows a case in which the target rotation speed Ntgt (n−1) and the instruction rotation speed Nc(n−1) previously obtained, and the current actual rotation speed Nf (n) are separated from each other by the current target rotation speed Ntgt (n). In this case, because the regulated rotation speed change rate Δng and the judgment difference Δnj have a different sign, the lower limitation value guard process sets the reflection coefficient K to 0.

FIG. 9C shows a case in which the target rotation speed Ntgt (n−1) and the instruction rotation speed Nc(n−1) previously obtained, and the current actual rotation speed Nf (n) are higher than the current target rotation speed Ntgt(n). In this case, because the regulated rotation speed change rate Δng and the judgment difference Δnj have the same sign. Further, the absolute value of the regulated rotation speed change rate Δng is larger than the absolute value of the judgment difference Δnj. The reflection coefficient K is therefore set to a value of more than 0 and less than 10.

It is possible for the control device for an electric rotary machine according to the third exemplary embodiment to obtain the same effects of the control device for an electric rotary machine according to the first exemplary embodiment.

(Other Modifications)

It is acceptable for each of the exemplary embodiments previously described to have the following modifications.

It is possible for the control device of an electric rotary machine according to each exemplary embodiment to avoid the execution of the upper limitation value guard process.

It is possible for the feedback control section 11c to further perform the differential control on the basis of the rotation speed difference ΔN.

The third exemplary embodiment has explained the method of smoothing the change rate of the target rotation speed Ntgt. However, this method is not limited by the third exemplary embodiment. For example, it is possible to use, as the instruction rotation speed Nc, a value obtained by the moving average process of the target rotation speed Ntgt.

It is possible to use another means, instead of using the clutch means capable of providing the engagement state and the disengagement state between the rotary shaft 31 of the motor generator 30 as the electric rotary machine and the output shaft 21 of the internal combustion engine 20. It is sufficient for another means to have the function capable of providing the engagement state between the rotary shaft 31 and the output shaft 21, and the disengagement state in which the rotary shaft 31 is disconnected from the output shaft 21. In addition, it is acceptable to use as the motor generator 30 a field winding synchronous motor instead of using the permanent magnet synchronous motor.

What is claimed is:

1. A control device for an electric rotary machine as a drive power source of a motor vehicle, comprising:
    an instruction torque calculation means capable of calculating an instruction torque of an electric rotary machine on the basis of a target rotation speed of the electric rotary machine;
    a correction torque calculation means capable of calculating a correction torque in order for an actual rotation speed of the electric rotary machine to follow the target rotation speed on the basis of a change rate of the target rotation speed per predetermined time and an inertia of a rotary body comprising the electric rotary machine;
    a correction means capable of correcting the instruction torque by using the correction torque calculated by the correction torque calculation means;
    a drive means capable of driving the electric rotary machine on the basis of the instruction torque which has been corrected by the correction means; and
    a correction rate correction means capable of decreasing the correction torque to be used for correcting the instruction torque, when the target rotation speed changes to decrease a difference between the target rotation speed and the actual rotation speed, wherein
    the correction rate correction means comprises a reflection coefficient setting means capable of setting, as a reflection coefficient to be used for correcting the correction torque, a value obtained by dividing a value, which is obtained by subtracting the actual rotation speed from the target rotation speed, by a value obtained by subtracting a previous target rotation speed from the current rotation speed,
    the reflection coefficient setting means sets the reflection coefficient to zero when the reflection coefficient becomes a negative value, and
    the reflection amount correction means decreases the correction torque by multiplying the correction torque by the reflection coefficient.

2. The control device for an electric rotary machine according to claim 1, wherein the reflection coefficient setting means subtracts a fluctuation component from the actual rotation speed, and uses a value obtained by the subtraction in order to set the reflection coefficient.

3. The control device for an electric rotary machine according to claim 1, further comprising a limitation means capable of limiting the instruction torque by using an upper limitation value when the instruction torque which has been corrected by the correction means exceeds an upper limitation value.

4. The control device for an electric rotary machine according to claim 1, further comprising:
    a clutch means capable of providing an engagement state and a disengagement state between a rotary shaft of the electric rotary machine and an output shaft of the internal combustion engine; and
    a switching means capable of changing an inertia value to be used for calculating the correction torque on the basis of the engagement state and the disengagement state between the rotary shaft of the electric rotary machine and the output shaft of the internal combustion engine provided by the clutch means.

5. The control device for an electric rotary machine according to claim 1, wherein the instruction torque calculation means calculates the instruction torque as an operation value with which a feedback control is performed, in order for the actual rotation speed to follow the target rotation speed, and
    the correction torque calculation means calculates the correction torque as a feedforward operation value in order for the actual rotation speed to follow the target rotation speed.

* * * * *